ELECTRONIC VIEWFINDER AND FOCUSING ARRANGEMENT

Filed Feb. 21, 1958

INVENTORS
PAUL LINDNER
ERICH KOSCHE
BY

ATTORNEYS

United States Patent Office 2,986,599
Patented May 30, 1961

2,986,599

ELECTRONIC VIEWFINDER AND FOCUSING ARRANGEMENT

Paül Lindner, Berlin-Pankow, and Erich Kosche, Berlin-Treptow, Germany, assignors to Betriebslaboratorium für Rundfunk und Fernsehen, Berlin-Adlershof, Germany Filed Feb. 21, 1958, Ser. No. 716,707

Claims priority, application Germany Mar. 6, 1957

9 Claims. (Cl. 178—7.2)

The present invention concerns an electric viewfinder, particularly for motion picture and television cameras. The known electronic viewfinders represent, for all practical purposes a television receiver installed in the camera (see Schwarzer, Television Receiver with Iconoscope and Monitoring Picture Producer, German Patent 765,637). The viewfinder image is viewed on a picture tube which in general is smaller than the picture tubes which are employed in normal television receivers. Such viewfinders have two disadvantages as compared with optical viewfinders, namely:

(1) No clear criterion is available for focusing the focal plane, as is the case for instance in optical rangefinders which operate by the coincidence principle (P. Lindner and E. Kosche: A New Optical Rangefinder for Television Cameras, Nachrichtentechnik 1956, No. 12, pages 538 to 544).

(2) The electronic viewfinder in its known design shows only the portion of the picture transmitted; it lacks a surrounding field which permits the cameraman better orientation.

These two disadvantages can be overcome in the case of optical rangefinders. However, they have the disadvantage that the lens cannot be stopped down as desired, since this is prevented by the so-called limit stop condition.

The object of the present invention is to provide an electronic viewfinder which avoids the above indicated disadvantages of the known electronic viewfinders and at the same time removes the limitation with regard to the use of optical rangefinders resulting from the limit-stop condition.

This result is achieved in accordance with the invention by employing a combination of optical and electronic structural elements, the signals for the control of the viewfinder picture tube being produced separately and not taken from the camera tube. The viewfinder tube signals are, therefore, not bound to any television standard.

The invention will be fully understood and other objects of the invention will become apparent from the following description and the drawing in which.

Figure 1:
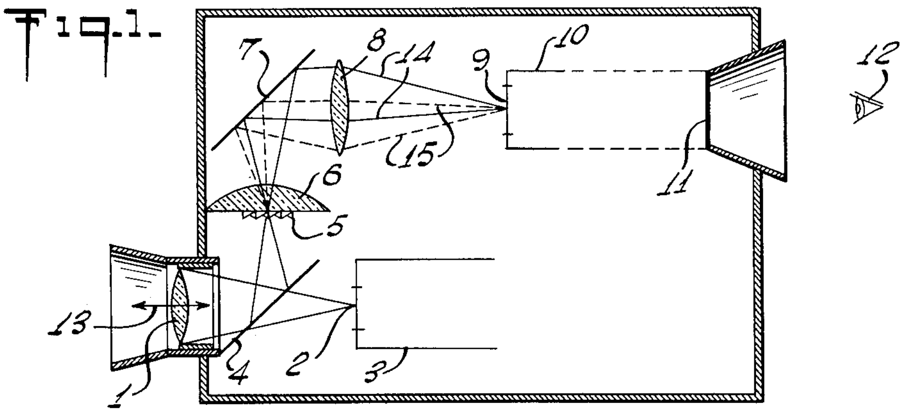
Fig. 1 shows one embodiment of the invention diagrammatically in top view.

Referring particularly to Fig. 1, lens 1 throws a picture onto the photo-cathode 2 of the camera pick-up tube 3. Between the lens and the photo-cathode there is a mirror 4 of low reflectivity inclined at an angle of 45° which removes a portion of the light for the viewfinder ray and throws a picture into the focusing plane of an image-splitting or measurement grid 5. This picture is greater than the picture size scanned on the photo-cathode 2 so that an excellent circular surrounding field is available for orientation. In this connection, it may be advisable, for various reasons, for the measuring grid 5 to be of a size equal only to the picture field proper. It need not be larger since the focusing takes place at all times only on objects within the image field proper.

Figure 2:
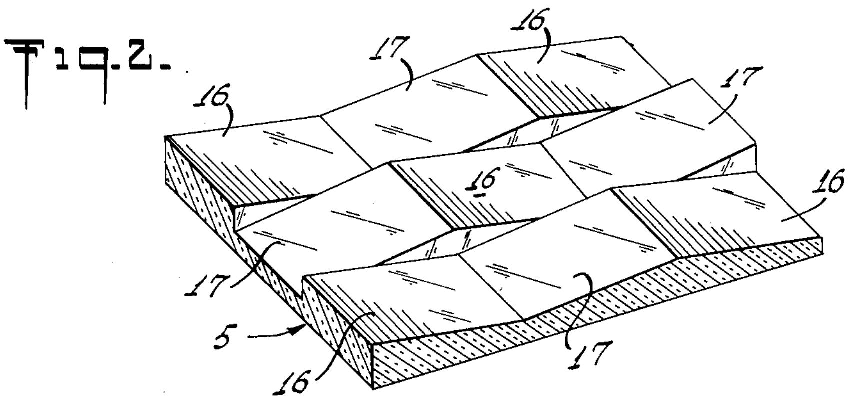
Fig. 2 is a perspective view of a portion of a measuring grid.

The measuring plate 5, which is mounted on the flat side of lens 6 may take many forms, several of which are disclosed in the above-mentioned publication by P. Lindner and E. Kosche. One particular form of the measuring grid 5 is illustrated in Fig. 2, which for illustrative purposes shows a small portion of the measuring plate. It consists of a large number of prismatic elements divided into two groups, of which the group of wedge-shaped elements 16 has one slope and the wedge-shaped elements 17 have an opposite and equal slope. Although the elements are shown as being rectangular, it is understood that they may have other shapes such as triangular, hexagonal, etc. Also, as shown in the above-mentioned publication, instead of being wedges, the elements may be cylindrical, spherical, etc.

Figure 3:
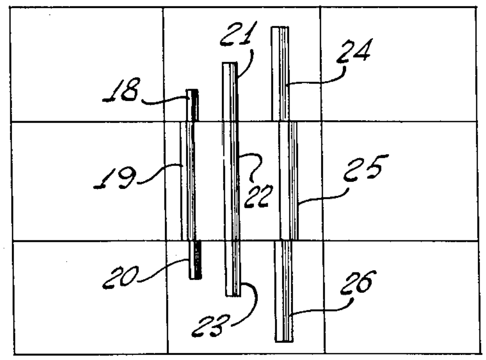
Fig. 3 is a diagram illustrating the operation of the measuring grid.

Directly behind the measuring grid 5, a field lens 6 is provided in the light ray path. It projects the outlet pupil of the viewing lens 1, via a mirror 7 inclined at an angle of 45° twice in the inlet pupil of a reversal lens 8. The reciprocal displacements represented by rays 14 and 15 are caused by the opposite inclination of the individual elements of the measurement grid, while the amount of the displacement depends on the wedge angle of the elements. The purpose of the lens 8 is to project the picture in the adjustment plane of the measurement grid onto the photo-cathode 9 of an image-viewing or pick-up tube 10. This image appears divided into a number of partial images equal to the number of individual elements which the measurement grid has. The partial images of a lens appear displaced with respect to each other until the object is sharply focused by displacement of adjustable lens 1, as indicated by arrow 13. Fig. 3 shows schematically how an image will appear on viewing screen 11. The portion 18, 19 and 20 of an image due to adjacent elements of the measuring grid will be displaced as shown when the image is focused behind the grid 5; and the corresponding portions of an image will appear as shown in 24, 25 and 26 when the image is focused in front of the measuring grid. When the image is focused in the plane of the measuring grid, the image portions 21, 22 and 23 will appear correctly aligned, as shown. In order properly to focus an image on the photo-cathode 2, the lens 1 is adjusted until the image appearing on screen 11 has all portions thereof correctly aligned, showing that every portion of the picture is in focus.

If the measurement grid 5 is only of a size equal to the picture field proper, the field is divided into partial images and the surrounding field is not subdivided. The optical focusing on the photo-cathode 9 is present only for objects which lie in the plane for which coincidence of the partial images is present in the projection and in addition within the range of depth of definition of the lens 1. Outside of this range, the image is blurred as on a ground glass plate. This ground glass plate effect makes it possible to use the arrangement in accordance with the invention even without the measuring grid if the advantages of the coincidence principle are waived.

The image on the photo-cathode 9 is projected electron-optically to the picture screen 11 of the viewing tube and observed thereby the eye 12. By the interposition of the electronic viewer, the limit-stop condition is removed, since the displacement of the pupil occurring upon direct observation becomes ineffective.

The invention is not limited to the use of image-viewing tubes, but also applies to those image converters or light relays in connection with which the fluorescent screen lies directly behind the image-conversion coating. The invention also relates to cases in which the picture converter is replaced for special reasons by a television link consisting of camera tube, transmission channel and receiving tube. For reasons connected with the increase of the brightness of the picture, it may be advisable to project the picture in small size on the screen 11 and to enlarge this picture by a lens system arranged between the screen 11 and the eye 12.

We claim:

1. An electronic viewfinder and focusing arrangement for moving picture and television systems comprising a camera pick-up tube, an adjustable lens for projecting an image on said tube, an image splitting grid mounted in a focal plane of said lens outside the path between said lens and said tube, first means includes a low-reflection mirror located directly between said lens and said tube for deflecting onto said grid a portion of the light passing through said lens, second means for producing a focused image for the output of the grid and third electronic image reproducing means for visibly presenting said focused image.

2. An arrangement according to claim 1 wherein the image splitting grid is of a size equal to the picture field of the camera pick-up tube.

3. An arrangement according to claim 1 wherein the image-splitting grid comprises a large number of prismatic elements divided into two groups so that the elements of one group deflect an image focused thereon by a given amount in one direction and the elements in the other group deflect the image by an equal amount in an opposite direction.

4. An arrangement according to claim 1 wherein the image-splitting grid is smaller than the image projected on to the plane of said grid so that an orientating field is produced around the portion of the image intercepted by the grid.

5. An arrangement according to claim 1, wherein said first means includes a low-reflection mirror inclined at 45° to the axis of the lens, wherein said second means includes a reversing lens and said third means includes an electronic image viewing tube comprising a photo-cathode and a fluorescent screen for visibly displaying the image projected on said photo-cathode.

6. An arrangement according to claim 1, wherein said third means includes a television pick-up tube and a television transmission and receiving system connected to said last-named pick-up tube.

7. An arrangement according to claim 1, wherein said third means comprises an image converter tube having a photo-cathode and a fluorescent screen directly behind said cathode.

8. An arrangement according to claim 1, wherein an optical magnifying system is juxtaposed to said fluorescent screen for magnifying the image thereon.

9. An electronic viewfinder and focusing arrangement for moving picture and television systems comprising a camera pick-up tube having a photoelectric cathode, an adjustable lens means for projecting an image on the cathode of said tube, an image splitting grid composed of prismatic elements having equally but oppositely sloping sides located outside the path between said lens means and said cathode, a low reflection mirror located between said lens means and said cathode inclined at an angle to the axis of said lens means for deflecting a portion of the light from said means onto said grid, and electronic and optical means including an electronic image-viewing tube having a photo-cathode located so as to receive the light deflected by said mirror for indicating the focusing conditions of the adjustable lens means.

References Cited in the file of this patent

UNITED STATES PATENTS

| | | |
|---|---|---|
| 2,669,916 | Dodin | Feb. 23, 1954 |
| 2,709,391 | Reeves | May 31, 1955 |

FOREIGN PATENTS

| | | |
|---|---|---|
| 166,211 | Austria | June 26, 1950 |
| 716,268 | Great Britain | Sept. 29, 1954 |

UNITED STATES PATENT OFFICE
CERTIFICATE OF CORRECTION

Patent No. 2,986,599 May 30, 1961

Paul Lindner et al.

It is hereby certified that error appears in the above numbered patent requiring correction and that the said Letters Patent should read as corrected below.

In the grant, line 1, and in the heading to the printed specification, line 4, name of first inventor, for "Paül Lindner", each occurrence, read -- Paul Lindner --; column 4, line 25, after "said", first occurrence, insert -- lens --.

Signed and sealed this 31st day of October 1961.

(SEAL)
Attest:

ERNEST W. SWIDER
Attesting Officer

DAVID L. LADD
Commissioner of Patents

USCOMM-DC